United States Patent
Tsuchihashi

(10) Patent No.: US 11,589,148 B2
(45) Date of Patent: Feb. 21, 2023

(54) HEADPHONE AND GRILLE UNIT

(71) Applicant: Yamaha Corporation, Hamamatsu (JP)

(72) Inventor: Yuu Tsuchihashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 17/395,000

(22) Filed: Aug. 5, 2021

(65) Prior Publication Data

US 2022/0046351 A1 Feb. 10, 2022

(30) Foreign Application Priority Data

Aug. 7, 2020 (JP) .............................. JP2020-134983

(51) Int. Cl.
| | |
|---|---|
| H04R 1/10 | (2006.01) |
| H04R 1/28 | (2006.01) |
| H04R 1/02 | (2006.01) |
| B60R 13/02 | (2006.01) |
| B60R 11/02 | (2006.01) |
| H04R 1/22 | (2006.01) |

(52) U.S. Cl.
CPC ......... *H04R 1/1008* (2013.01); *H04R 1/1083* (2013.01); *H04R 1/2846* (2013.01); *B60R 11/0217* (2013.01); *B60R 13/02* (2013.01); *H04R 1/023* (2013.01); *H04R 1/22* (2013.01); *H04R 1/2803* (2013.01); *H04R 2499/13* (2013.01); *H04R 2499/15* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,819,879 | A | * | 6/1974 | Baechtold | H04R 1/225 381/353 |
| 6,651,772 | B1 | * | 11/2003 | Esser | H04R 1/023 181/171 |
| 2003/0042068 | A1 | * | 3/2003 | Lee | H04R 1/2803 181/155 |
| 2016/0165335 | A1 | * | 6/2016 | Goossens | H04R 3/08 381/351 |
| 2017/0006373 | A1 | * | 1/2017 | Bruss | H04R 1/2849 |
| 2017/0366894 | A1 | * | 12/2017 | Horbach | H04R 1/1075 |
| 2018/0333091 | A1 | | 11/2018 | Goldman | |
| 2019/0233807 | A1 | * | 8/2019 | Courbois | C12N 9/96 |
| 2022/0086558 | A1 | * | 3/2022 | Yamamoto | H04R 1/1091 |

FOREIGN PATENT DOCUMENTS

| | | |
|---|---|---|
| EP | 0 688 142 A2 | 12/1995 |
| EP | 0688142 A2 * | 12/1995 |
| JP | 2020-43547 A | 3/2020 |

OTHER PUBLICATIONS

Extended European Search Report issued in European Application No. 21189711.1 dated Dec. 23, 2021 (seven (7) pages).

* cited by examiner

*Primary Examiner* — Matthew A Eason
*Assistant Examiner* — Kuassi A Ganmavo
(74) *Attorney, Agent, or Firm* — Crowell & Moring LLP

(57) ABSTRACT

A headphone includes a speaker unit, a baffle plate, an ear pad, and a grille. The baffle plate is configured to support the speaker unit. The ear pad is configured to surround an acoustic space in which a sound emitted from the speaker unit is transmitted toward an ear of a listener. The grille is configured to cover the speaker unit. The grille has a hole and a cavity connected to the hole.

13 Claims, 4 Drawing Sheets

HEADPHONE AND GRILLE UNIT

CROSS-REFERENCE TO RELATED APPLICATIONS

This application is based on and claims priority under 35 USC 119 from Japanese Patent Application No. 2020-134983 filed on Aug. 7, 2020, the contents of which are incorporated herein by reference.

TECHNICAL FIELD

The present disclosure relates to a headphone and a grille unit.

BACKGROUND

There is a noise cancelling headphone provided with an active noise cancelling device. In the noise cancelling headphone, a microphone is provided in a housing in addition to a speaker unit that functions as a sound emitting body of a normal headphone. In the active noise cancelling device, the microphone collects a noise sound and generates a noise sound signal and an acoustic signal from the noise sound signal. The acoustic signal for emitting a cancelling sound having a phase opposite to a phase of the noise sound in the vicinity of a sound receiving point from the speaker unit is supplied to the speaker unit. In this manner, the noise sound and the cancelling sound are cancelled out in the vicinity of the sound receiving point, and the noise sound is suppressed.

However, when a frequency of the noise sound is high, since a wavelength in this frequency is reduced, a delay of a series of processings, for example, the microphone generates a noise sound signal, generates an acoustic signal from the noise sound signal, and emits a sound from the speaker unit, cannot be ignored in the active noise cancelling device. Therefore, in a band of a certain frequency or higher, the cancelling sound cannot be maintained at a phase opposite to a phase of the original noise sound. As a result, there is a problem that a noise sound to be suppressed diverges in reverse. Therefore, there are many cases in which a noise sound in a high frequency band relies on passive noise cancelling in which the sound is insulated and absorbed by another unit, that is, an ear pad or the like.

When a sound is insulated by an ear pad, the sound leaks into the headphone through a gap between a head of a listener and the ear pad. In this case, in a specific frequency band, an external ear serves as a wall surface and standing waves are generated in the headphone, specifically, in a space surrounded by the speaker unit, an ear, the ear pad, and a baffle plate, and a phenomenon in which a noise sound is enhanced occurs.

FIGS. 7 and 8 are diagrams showing acoustic analysis results when a sound leaks and enters a headphone internal space surrounded by an inner wall surface 3a of the ear pad from a gap of a part of the ear pad in front of an ear 7. FIG. 7 shows a sound pressure distribution in the headphone internal space as viewed from the speaker unit side. FIG. 8 shows a sound pressure distribution in a cross section taken along a line I-I' of the headphone internal space shown in FIG. 7. In FIGS. 7 and 8, a sound pressure of each portion in the headphone internal space is indicated by a density of dots.

In FIG. 7, a sound pressure is increased in a region A1 in which a gap is formed between the ear pad and the head of the listener. It is considered that this is because a noise sound leaks from the outside into the headphone internal space through the region A1. As shown in FIGS. 7 and 8, in the headphone internal space, it can be confirmed that a sound pressure in a region A2 in the vicinity of the external ear 7 rapidly increases, and a sound pressure level in the vicinity of an eardrum increases (that is, a noise increases). This is because the ear is close to the speaker unit, the headphone internal space is substantially divided into two spaces by the external ear 7, and standing waves are generated in each of the two spaces in which the external ear 7 serves as a wall. It is confirmed that standing waves are generated in a frequency band around about 1 kHz to 3 kHz in a normal headphone although it depends on a shape of the headphone.

It is difficult for the active noise cancelling device to suppress standing waves in a high frequency band. An existing earphone, discloses a technique for forming a resonance space having an opening portion that is opened in an annular protective member that protects a diaphragm and is opened toward a sound channel through which a sound generated by the diaphragm passes. According to the existing earphone, a Helmholtz resonator is formed by the opening portion and the resonance space, and generation of an unpleasant sound is suppressed.

However, the existing earphone does not have an element corresponding to an ear pad of a headphone. Therefore, the technique disclosed in the existing earphone cannot solve the problem of suppressing standing waves generated in a headphone due to a noise sound that leaks and enters the headphone through a gap between an ear pad and a head of a listener.

SUMMARY

The present disclosure has been made in view of the circumstances described above, and an object of the present disclosure is to provide a technical method for suppressing standing waves generated in a headphone due to a noise sound that leaks and enters the headphone through a gap between an ear pad and a head of a listener.

According to an aspect of the present disclosure, there is provided a headphone including a speaker unit, a baffle plate configured to support the speaker unit, an ear pad configured to surround an acoustic space in which a sound emitted from the speaker unit is transmitted toward an ear of a listener, and a grille configured to cover the speaker unit, in which the grille has a hole and a cavity connected to the hole.

There is also provided a grille unit including a grille configured to cover a speaker unit, in which the grille includes a plurality of sets of holes and cavities connected to the holes respectively.

DETAILED DESCRIPTION

Hereinafter, an embodiment of the present disclosure will be described with reference to the drawings.

Figure 1:
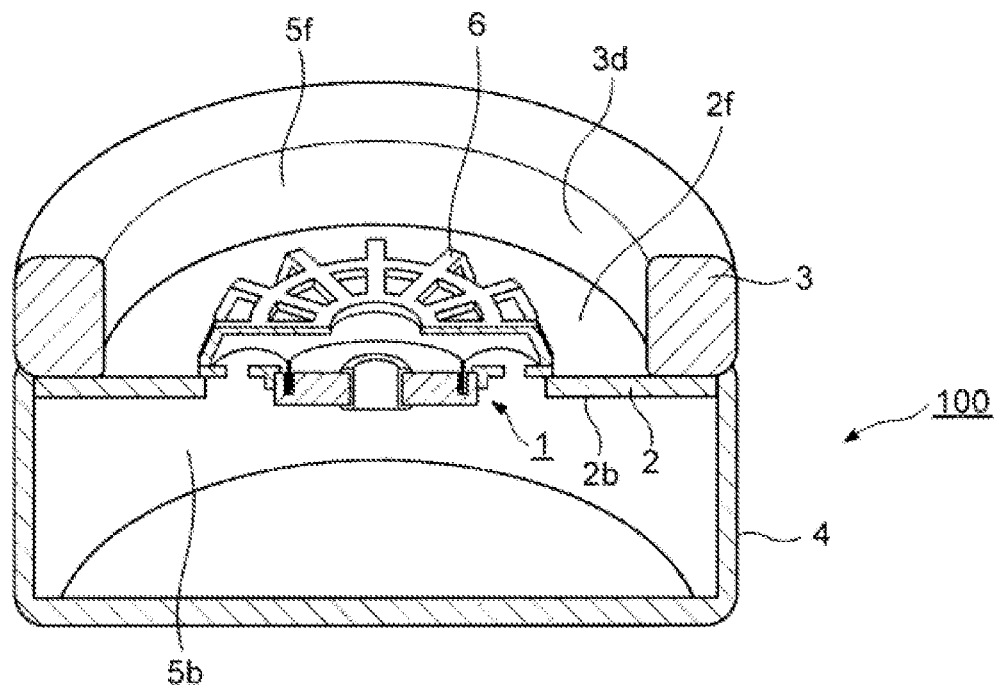
FIG. 1 is a cross-sectional perspective view showing a configuration of an inventive headphone.
Figure 2:
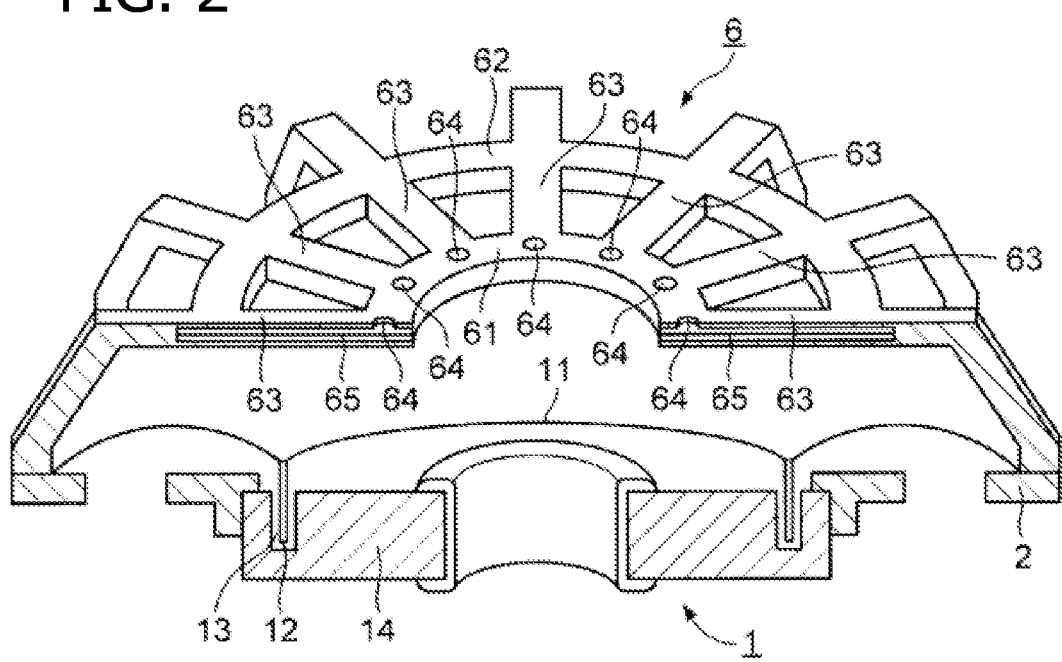
FIG. 2 is an enlarged cross-sectional perspective view showing a speaker unit and a grille of the headphone.

FIG. 1 is a cross-sectional perspective view showing a configuration of a headphone 100 according to an embodiment of the present disclosure. FIG. 2 is an enlarged cross-sectional perspective view showing a speaker unit 1 and a grille 6 of the headphone 100 shown in FIG. 1.

In the headphone 100, the speaker unit 1 emits a sound, and is supported at a substantial center portion of a baffle plate 2 having a substantially circular shape as shown in FIG. 1. Here, the speaker unit 1 is an electromagnetic speaker unit. As shown in FIG. 2, the speaker unit 1 includes a diaphragm 11 having a substantial disc shape, and whose periphery portion is fixed, a voice coil bobbin 12 attached to a lower surface of the diaphragm 11, and a magnetic circuit 14 provided with a magnetic gap 13 into which the voice coil bobbin 12 is inserted. In the speaker unit 1, when the voice coil bobbin 12 is energized, the diaphragm 11 vibrates in an upper-lower direction in the drawing (FIG. 2), and a sound is emitted to an upper side and a lower side in the drawing.

As shown in FIG. 1, a substantially annular ear pad 3 is attached to a periphery portion of a front surface 2f of the baffle plate 2. The ear pad 3 comes into contact with a head of a listener when the headphone 100 is used.

The baffle plate 2 has the front surface 2f and a back surface 2b opposite to the front surface 2f. The headphone 100 includes a hollow lid-like housing 4 that covers the back surface 2b of the baffle plate 2.

When the headphone 100 is used, a front cavity 5f surrounded by the front surface 2f of the baffle plate 2, an inner wall surface 3d of the ear pad 3, and the head of the listener is formed. A back cavity 5b is provided at a side of the back surface 2b of the baffle plate 2, and the back cavity 5b is an enclosed space surrounded by the back surface 2b and an inner wall surface of the housing 4.

In the headphone 100, a sound emitted from the diaphragm 11 of the speaker unit 1 to the front surface 2f of the baffle plate 2 is transmitted to an eardrums of an ear of the listener via the front cavity 5f. Therefore, the ear pad 3 is a member that surrounds an acoustic space (the front cavity 5f) in which the sound emitted from the speaker unit 1 is transmitted toward the ear of the listener.

As shown in FIG. 1, a periphery portion of the grille 6 is fixed to the front surface 2f of the baffle plate 2 and covers the speaker unit 1. The outer shape of the grille 6 is a substantially circular shape, and a center position of the circle coincides with a center position of a circle of the speaker unit 1 having a substantially circular shape. The grille 6 is generally a member that protects the speaker unit 1. The grille 6 according to the present embodiment does not only play a role of protecting the speaker unit 1.

As shown in FIG. 2, the grille 6 includes a central annular portion 61 having a substantially circular shape, a periphery annular portion 62 that has a substantially circular shape and located outside of the central annular portion 61, and a plurality of frame portions 63 that connect the central annular portion 61 to the periphery annular portion 62. Here, the plurality of frame portions 63 radially extend from the central annular portion 61, intersect the periphery annular portion 62, and are bent toward the front surface 2f of the baffle plate 2. End portions of the plurality of frame portions 63 are fixed to the front surface 2f. On a surface of the central annular portion 61 at an opposite side to the speaker unit 1, holes 64 are provided in the vicinity of positions where the frame portions 63 are connected. These holes 64 face an external ear of the listener in a state in which the headphone 100 is worn on the head of the listener. Each of the frame portions 63 has a cavity 65 connected to the hole 64. The hole 64 and the cavity 65 form a Helmholtz resonator. In the present embodiment, the grille 6 includes a plurality of sets of the holes 64 and the cavities 65 which is connected to the holes 64. Each of the plurality of sets of the holes 64 and the cavities 65 forms the Helmholtz resonator.

Figure 3:
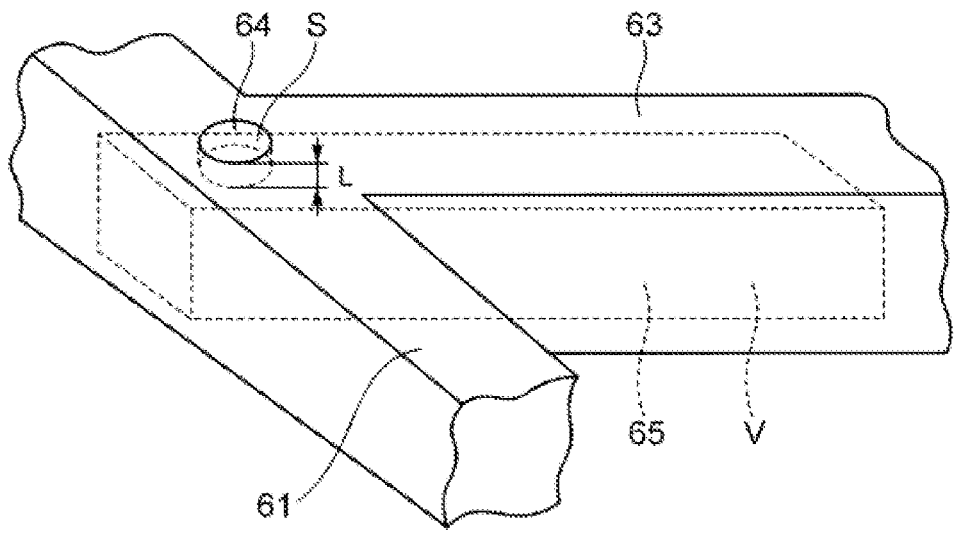
FIG. 3 is a perspective view showing a schematic configuration of a Helmholtz resonator provided in the grille.

FIG. 3 is a perspective view showing a schematic configuration of a Helmholtz resonator provided in the grille 6. A resonance frequency fr of the Helmholtz resonator can be calculated by the following formula, in which an area of the hole 64 is S, a depth of the hole 64 is L, a volume of the cavity 65 connected to the hole 64 is V, and a sound velocity is c.

$$fr = (c/2\pi)\sqrt{(S/(V \cdot L))} \qquad (1)$$

In the present embodiment, the area S of the hole 64, the depth L of the hole 64, and the volume V of the cavity 65 of the Helmholtz resonator are determined such that the resonance frequency fr is a frequency of standing waves generated in the front cavity 5f.

Figure 4:
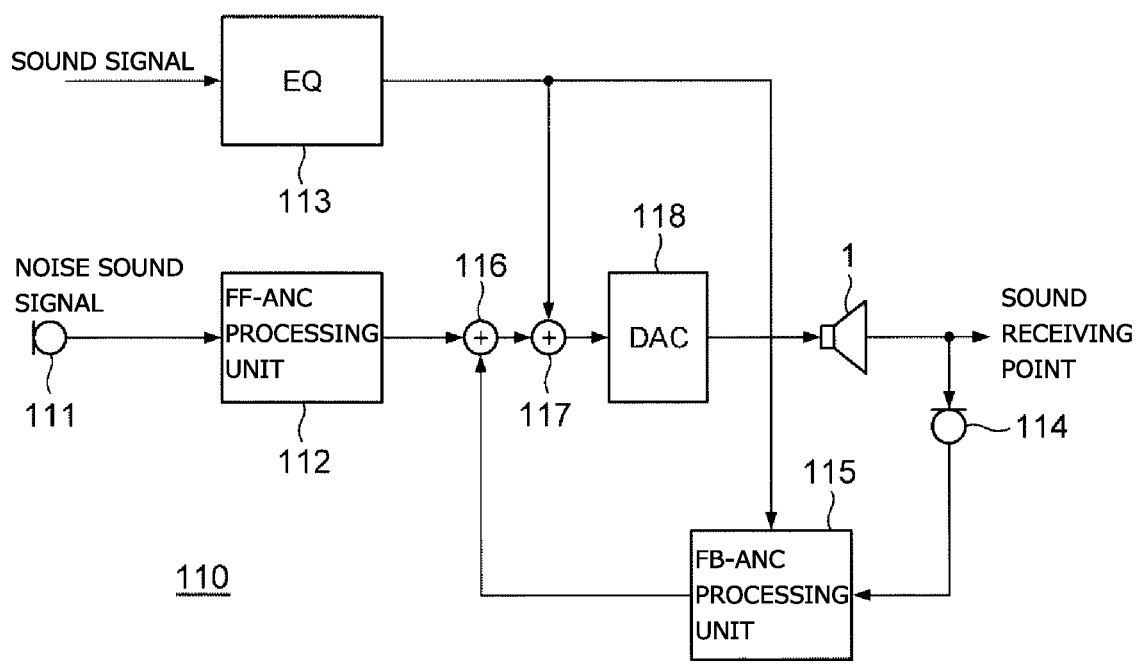
FIG. 4 is a block diagram showing a configuration of an active noise cancelling device provided in the headphone.

Although not shown in FIGS. 1 and 2, the headphone 100 according to the present embodiment is provided with an active noise cancelling device 110 shown in FIG. 4. In FIG. 4, a first microphone 111 collects a noise sound generated in the front cavity 5f and outputs a noise sound signal. A feed forward active noise cancelling (FF-ANC) processing unit 12 generates an acoustic signal for emitting, from the speaker unit 1, a cancelling sound having a phase opposite to a phase of a noise sound at a sound receiving point (usually near the eardrum of the external ear).

An equalizer (EQ) 113 adjusts a frequency characteristic of a sound signal to be emitted and outputs the sound signal. The output signal of the EQ 113 is supplied to the speaker unit 1 via an adder 117 and a digital analog converter (DAC) 118, and is emitted by the speaker unit 1.

A second microphone 114 collects a sound in the vicinity of the sound receiving point. An output signal of the second microphone 114 includes a signal corresponding to the output signal of the EQ 113 and a noise sound signal. A feedback active noise cancelling (FB-ANC) processing unit 115 generates an acoustic signal obtained by removing a signal corresponding to the output signal of the EQ 113 from the output signal of the second microphone 114, that is, a noise sound signal, and generates, from the noise sound signal, an acoustic signal for emitting a cancelling sound having a phase opposite to a phase of the noise sound at the sound receiving point from the speaker unit 1.

An adder 116 adds the acoustic signal output from the FF-ANC processing unit 112 and the acoustic signal output from the FB-ANC processing unit 115. The adder 117 adds the output signal from the adder 116 and the output signal from the EQ 113. The DAC 118 converts the output signal of the adder 116 from a digital format to an analog format, and supplies the converted signal to the speaker unit 1.

In the active noise cancelling device 110, the FF-ANC processing unit 112 generates, from the output signal of the first microphone 111, an acoustic signal for emitting a cancelling sound having a phase opposite to a phase of the noise sound at the sound receiving point from the speaker unit 1, and supplies the acoustic signal to the speaker unit 1 via the adders 116 and 117 and the DAC 118. In the active noise cancelling device 110, the FB-ANC processing unit 115 generates, from the output signal of the second microphone 114, an acoustic signal for generating a cancelling sound having a phase opposite to a phase of the noise sound at the sound receiving point, and supplies the acoustic signal to the speaker unit 1 via the adders 116 and 117 and the DAC 118. Therefore, the active noise cancelling device 110 can cancel out the noise sound and the cancelling sound at the sound receiving point and suppress the noise sound.

In the headphone 100, when a sound leaks from a gap between the ear pad 3 and the head of the listener, standing waves of about 1 kHz to 3 kHz are generated in the front cavity. Such standing waves having a high frequency are less likely to be suppressed by the active noise cancelling device 110.

However, the grille 6 of the headphone 100 according to the present embodiment is provided with the hole 64 and the cavity 65 that function as a Helmholtz resonator. The hole 64 is located at a position facing the external ear of the listener surrounded by the ear pad 3, that is, the hole 64 is located at a position of an antinode of a sound pressure of the standing waves. The Helmholtz resonator has a Helmholtz resonance frequency close to a frequency of the standing waves. Therefore, the Helmholtz resonator can suppress standing waves having a frequency of about 1 kHz to 3 kHz in the front cavity.

Figure 5:
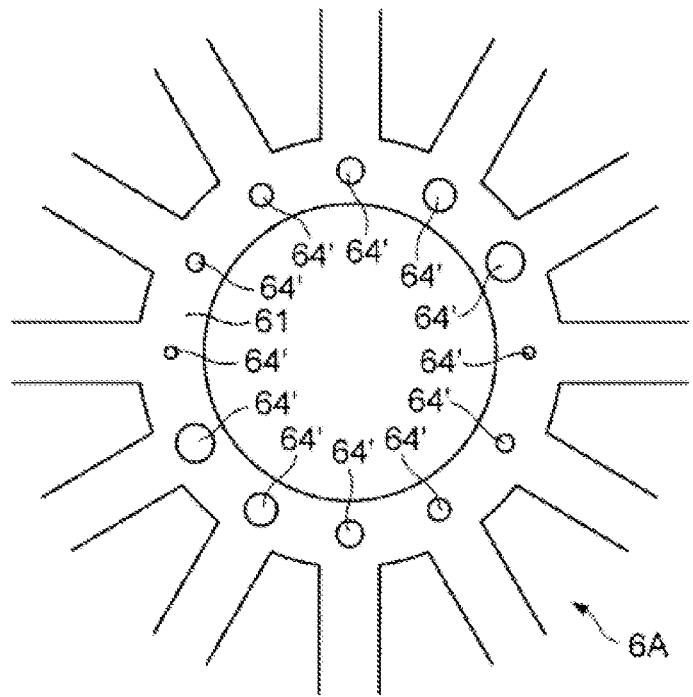
FIG. 5 is a plan view showing a configuration of a grille in an inventive headphone.

(1) FIG. 5 is a plan view showing a configuration of a grille 6A in a headphone according to an embodiment of the present disclosure. The holes 64 of a plurality of Helmholtz resonators provided in the grille 6 have the same area in the embodiment described above. On the other hand, holes 64' of a plurality of Helmholtz resonators provided in the grille 6A have different areas in an aspect shown in FIG. 5. That is, the grille 6A is provided with a plurality of types of Helmholtz resonators having different resonance frequencies in this aspect. According to this aspect, it is possible to suppress standing waves in a wide frequency band generated in the front cavity 5f. Alternatively, the grille 6 may be provided with a plurality of types of Helmholtz resonators having different resonance frequencies, in which each of the Helmholtz resonators includes the hole 64 and the cavity 65 connected to the hole 64 and volumes V of the cavities 65 are different from each other. Alternatively, the grille 6 may be provided with a plurality of types of Helmholtz resonators having different resonance frequencies, in which each of the Helmholtz resonators includes the hole 64 and the cavity 65 connected to the hole 64, areas of the holes 64 are different from each other, volumes V of the cavities 65 are different from each other.

Figure 6:
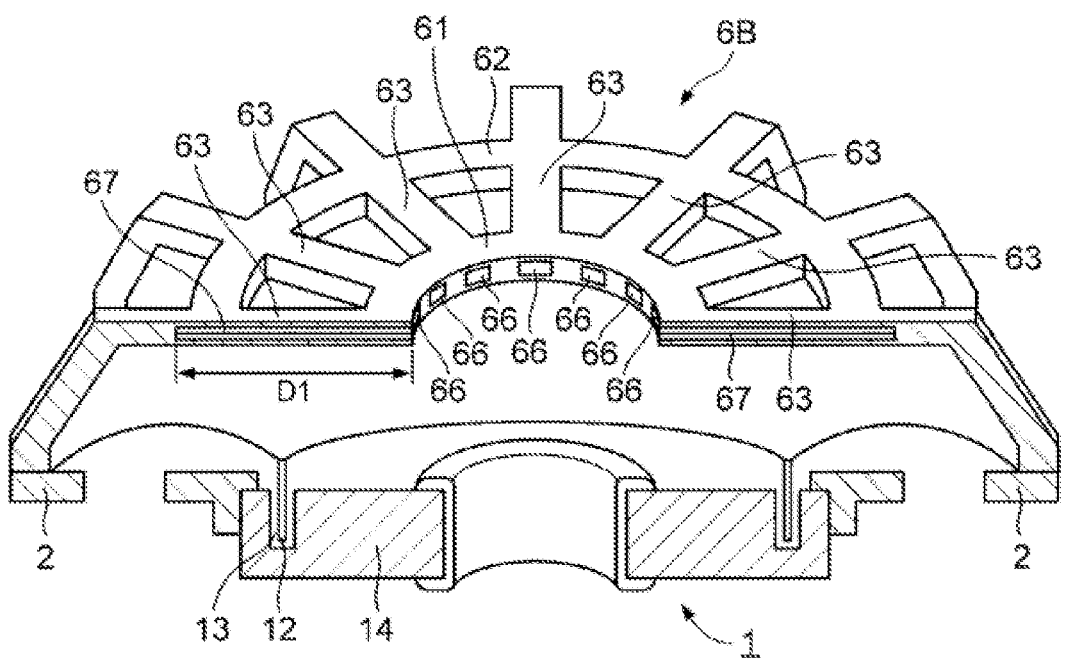
FIG. 6 is an enlarged cross-sectional perspective view showing a speaker unit and a grille of an inventive headphone.
Figure 7:
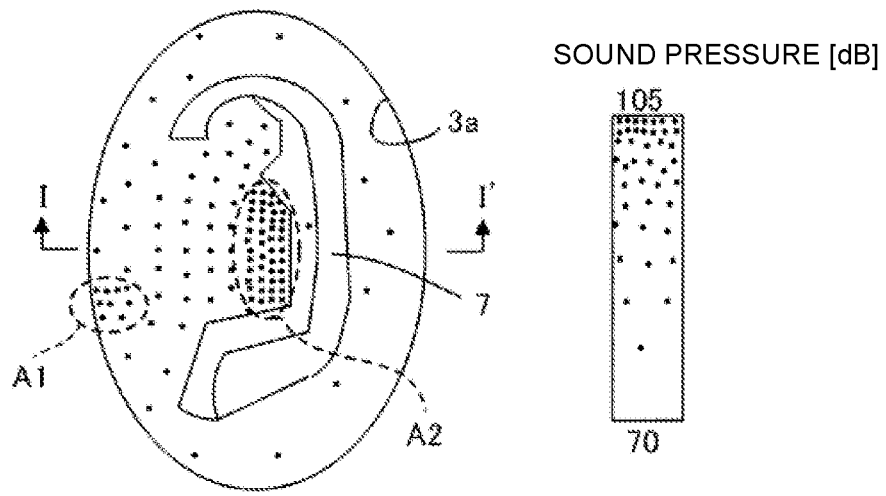
FIG. 7 is a diagram showing a sound pressure distribution inside a headphone when a noise sound leaks into the headphone through a gap between an ear pad and a head of a listener.
Figure 8:
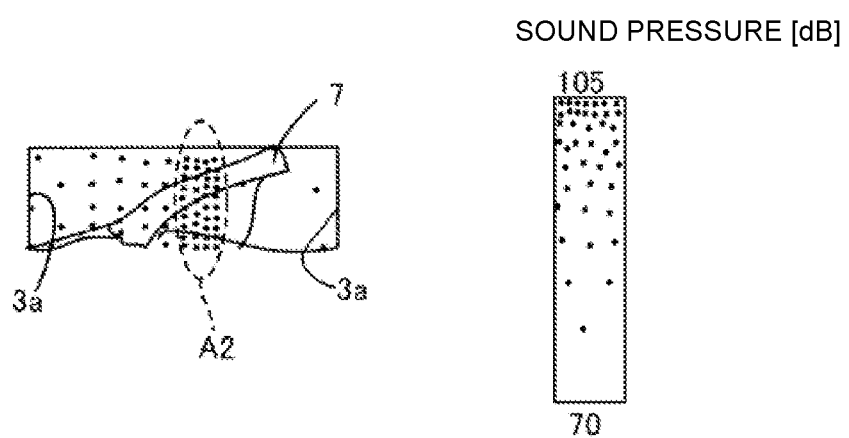
FIG. 8 is a diagram showing a sound pressure distribution in a cross section taken along a line I-I' in FIG. 7.

(2) FIG. 6 is an enlarged cross-sectional perspective view showing the speaker unit 1 and a grille 6B of a headphone according to another embodiment of the present disclosure. A configuration of the speaker unit 1 is the same as the configuration of the speaker unit 1 in the embodiment described above (FIG. 2). A configuration of a resonator provided in the grille 6B in an aspect shown in FIG. 6 is different from a configuration of the resonator in the embodiment described above (FIG. 2). In the aspect shown in FIG. 6, holes 66 are provided in the inner peripheral wall surface of the central annular portion 61 and in the vicinity of positions through which central axes of the frame portions 63 pass, and the holes 66 are connected to cavities 67 provided in the frame portions 63. Here, the cavity 67 has the same cross-sectional area as an area of the hole 66. In the aspect shown in FIG. 6, each set of the hole 66 and the cavity 67 connected to the hole 66 forms a hollow tubular tube resonator. The tube resonator is a one side opened tube resonator in which an inner peripheral wall surface side of the central annular portion 61 is an opened tube and an opposite side to the opened tube is a closed tube. As described above, the grille 6B is provided with a plurality of tube resonators including a plurality of sets of holes 66 and cavities 67 in the aspect shown in FIG. 6.

A resonance frequency fr can be calculated by the following formula in which a tube length of the tube resonator is D in FIG. 6.

$$fr=(2n-1)c/(4D)(n=1,2,3\ldots) \quad (2)$$

In the aspect shown in FIG. 6, the resonance frequency fr of the tube resonator is determined in accordance with a frequency of standing waves generated in the front cavity, and the tube length D of the tube resonator is determined in accordance with the resonance frequency fr.

In the aspect shown in FIG. 6, the grille 6B is provided with a plurality of tube resonators, the resonance frequencies fr of the tube resonators may be the same or may be different from each other. When the resonance frequencies of the plurality of tube resonators are different from each other, standing waves in a wide frequency band can be suppressed.

(3) The Helmholtz resonator in the embodiment described above and the tube resonator shown in FIG. 6 may be mixed in one grille. In this case, the grille may be provided with a plurality of Helmholtz resonators and a plurality of tube resonators. That is, a plurality of sets of holes and cavities provided in the grille may be neck portions having a depth, and each of the neck portions may include a set of a cavity and a hole connected to the cavity (Helmholtz resonator), and a set of a hole and a cavity (tube resonator) in which the hole and the cavity connected to the hole form a hollow tube shape.

(4) Although the central annular portion 61 and the periphery annular portion 62 have a substantially circular shape in the embodiment described above, the central annular portion 61 and the periphery annular portion 62 may have a shape other than a circular shape, such as a rectangular shape.

(5) A set of the grille 6 and the speaker unit 1 according to the embodiment described above, that is, a speaker unit provided with a grille having a plurality of Helmholtz resonators may be manufactured and provided to a user. In this case, the plurality of Helmholtz resonators having different resonance frequencies may be provided in the grille. Instead of the plurality of Helmholtz resonators, a plurality of tube resonators may be provided in the grille. Alternatively, a plurality of Helmholtz resonators and a plurality of tube resonators may be mixed in the grille. That is, the present disclosure can also be implemented as a speaker unit provided with a grille that covers the speaker unit, in which the grille includes a plurality of sets of holes and cavities connected to the holes.

What is claimed is:

1. A headphone comprising:
   a speaker unit;
   a baffle plate configured to support the speaker unit;
   an ear pad configured to surround an acoustic space in which a sound emitted from the speaker unit is transmitted toward an ear of a listener; and
   a grille configured to cover the speaker unit, wherein
   the grille has a hole and a cavity connected to the hole;

the grille includes a central annular portion, a periphery annular portion, and a frame portion connecting the central annular portion and the periphery annular portion;

the hole is provided in the central annular portion, and the cavity is provided in the frame portion;

the cavity is provided inside the frame portion and extends along a longitudinal direction of the frame portion; and the hole is communicated to the cavity and opens outside of the frame portion.

2. The headphone according to claim 1, wherein the hole faces an external ear of the ear of the listener.

3. The headphone according to claim 1, wherein the hole opens in the longitudinal direction of the frame portion.

4. The headphone according to claim 1, wherein the grille includes a plurality of sets of holes and cavities connected to the holes.

5. The headphone according to claim 4, wherein the plurality of sets of the holes and the cavities include a set of the hole and the cavity in which an area of the hole is smaller than a cross-sectional area of the cavity connected to the hole, and the hole is connected to the cavity via a neck portion having a same cross-sectional area as that of the hole.

6. The headphone according to claim 4, wherein the plurality of sets of the holes and the cavities include a set of the hole and the cavity in which the hole and the cavity connected to the hole form a hollow tube shape.

7. The headphone according to claim 4, wherein the plurality of sets of the holes and the cavities include:

a set of the hole and the cavity in which a cross-sectional area of the hole is smaller than a cross-sectional area of the cavity connected to the hole and the hole is connected to the cavity via a neck portion having a same cross-sectional area as that of the hole: and a set of the hole and the cavity in which the hole and the cavity connected to the hole form a hollow tube shape.

8. A grille unit comprising:

a grille configured to cover a speaker unit, wherein the grille includes a plurality of sets of holes and cavities connected to the holes respectively;

the grille includes a central annular portion, a periphery annular portion, and a frame portion connecting the central annular portion and the periphery annular portion;

the holes are provided in the central annular portion, and the cavities are provided in the frame portions;

the cavity is provided inside each of the frame portions and extends in a longitudinal direction of the corresponding frame portion; and in each of the plurality of sets of holes and cavities, the hole is communicated to the cavity and opens outside of the frame portion.

9. The grille unit according to claim 8, wherein the holes face an external ear of the ear of the listener.

10. The grille unit according to claim 8, wherein each of the holes opens in the longitudinal direction of the corresponding frame portion.

11. The grille unit according to claim 8, wherein the plurality of sets of the holes and the cavities include a set of the hole and the cavity in which an area of the hole is smaller than a cross-sectional area of the cavity connected to the hole, and the hole is connected to the cavity via a neck portion having a same cross-sectional area as that of the hole.

12. The grille unit according to claim 8, wherein the plurality of sets of the holes and the cavities include a set of the hole and the cavity in which the hole and the cavity connected to the hole form a hollow tube shape.

13. The grille unit according to claim 8, wherein the plurality of sets of the holes and the cavities include:

a set of the hole and the cavity in which a cross-sectional area of the hole is smaller than a cross-sectional area of the cavity connected to the hole and the hole is connected to the cavity via a neck portion having a same cross-sectional area as that of the hole; and a set of the hole and the cavity in which the hole and the cavity connected to the hole form a hollow tube shape.

* * * * *